United States Patent [19]
Suzuki

[11] Patent Number: 5,326,200
[45] Date of Patent: Jul. 5, 1994

[54] PRESS AND SUCTION APPARATUS OF A NUMBERICAL CONTROL ROUTER

[75] Inventor: Nobuyoshi Suzuki, Shizuoka, Japan

[73] Assignee: Heian Corporation, Shizuoka, Japan

[21] Appl. No.: 494

[22] Filed: Jan. 5, 1993

[51] Int. Cl.$^5$ .......................... B23C 1/06; B23Q 3/06; B23Q 11/02

[52] U.S. Cl. ...................... 409/137; 83/451; 144/134 A; 144/136 R; 408/98; 409/189

[58] Field of Search ............. 409/137, 163, 189, 190, 409/197; 408/95, 98; 83/453, 451; 144/134 A, 136 R, 242 A, 278 A, 252 R

[56] References Cited

U.S. PATENT DOCUMENTS

| | | | |
|---|---|---|---|
| 3,183,743 | 5/1965 | O'Donnell et al. | 408/95 X |
| 4,313,478 | 2/1982 | Suzuki | 409/189 X |
| 4,382,728 | 5/1983 | Anderson et al. | 409/137 |
| 4,610,582 | 9/1986 | Amos et al. | 409/163 |
| 4,657,452 | 4/1987 | Astigiano et al. | 409/190 |
| 4,822,219 | 4/1989 | Wood et al. | 408/95 X |
| 4,909,681 | 3/1990 | Drier, Jr. | 409/137 |
| 4,917,547 | 4/1990 | Frederickson et al. | 408/98 X |
| 4,966,508 | 10/1990 | Otani et al. | 409/189 |

FOREIGN PATENT DOCUMENTS 4082611 3/1992 Japan ............... 409/137

*Primary Examiner*—William Briggs
*Attorney, Agent, or Firm*—Burgess, Ryan & Wayne

[57] ABSTRACT

Press members are fixed to operating shafts of cylinders and guides attached to supporting portions are fixed to a supporting frame and suction ducts are fixed to cylinders provided with the supporting frame. The press members are driven to suck a sacrifice board and a process board which are not flat on a suction table. The suction ducts are driven to remove chips and dust on the table, the sacrifice board and the process board.

4 Claims, 13 Drawing Sheets

PRESS AND SUCTION APPARATUS OF A NUMBERICAL CONTROL ROUTER

BACKGROUND OF THE INVENTION

The present invention relates to a press and suction apparatus of a numerical control router for pressing a sacrifice board or a process board on a suction table and for sucking chips and dust on the suction table or the sacrifice board.

Generally, when a process board is processed with the numerical control router, after a sacrifice board is positioned on the suction table, the process board is positioned on the sacrifice board. Because the sacrifice board and the process board may be warped and therefore not flat, the sacrifice board is not sucked on the suction table and the process board is not sucked on the sacrifice board. Therefore, when the sacrifice board or the process board is not sucked, because men press the sacrifice board or the process board on the table or on the sacrifice board, additional time is required for positioning the sacrifice board or the process board.

When the process board has a large warp and men cannot press the process board on the sacrifice board, time loss arises when the process board is removed and the next process board is positioned.

When the process board is processed, chips are scattered on the sacrifice board and the process board. These chips are sucked by hoses connected to a suction device provided with a process head. The operation of the process head becomes complex because the hoses and the suction device are moved with the process head.

SUMMARY OF THE INVENTION

It is, therefore, the primary object of the present invention to provide a press and suction apparatus in a numerical control router for pressing a sacrifice board or a process board which may be warped having warp on a suction table or the sacrifice board.

It is, therefore, the other object of the present invention to provide a press and suction apparatus in a numerical control router for sucking chips scattered on the process board, the sacrifice board and the suction table.

In order to accomplish the above and other objects, the present invention comprises comprises a head structure provided with a process head having a main shaft motor with a rotary shaft for fixing a tool of a drill or cutter, the head structure being moved on a first rail which is provided with a supporting bed, a suction table on a second rail, which is provided with the supporting bed, for fixing a sacrifice board and a process board which is moved at right angle to the movement of the head structure, a supporting frame which is provided with the supporting bed, and a plurality of press cylinders having a plurality of press member mounted on the supporting frame.

DESCRIPTION OF THE PREFERRED EMBODIMENTS

Figure 1:
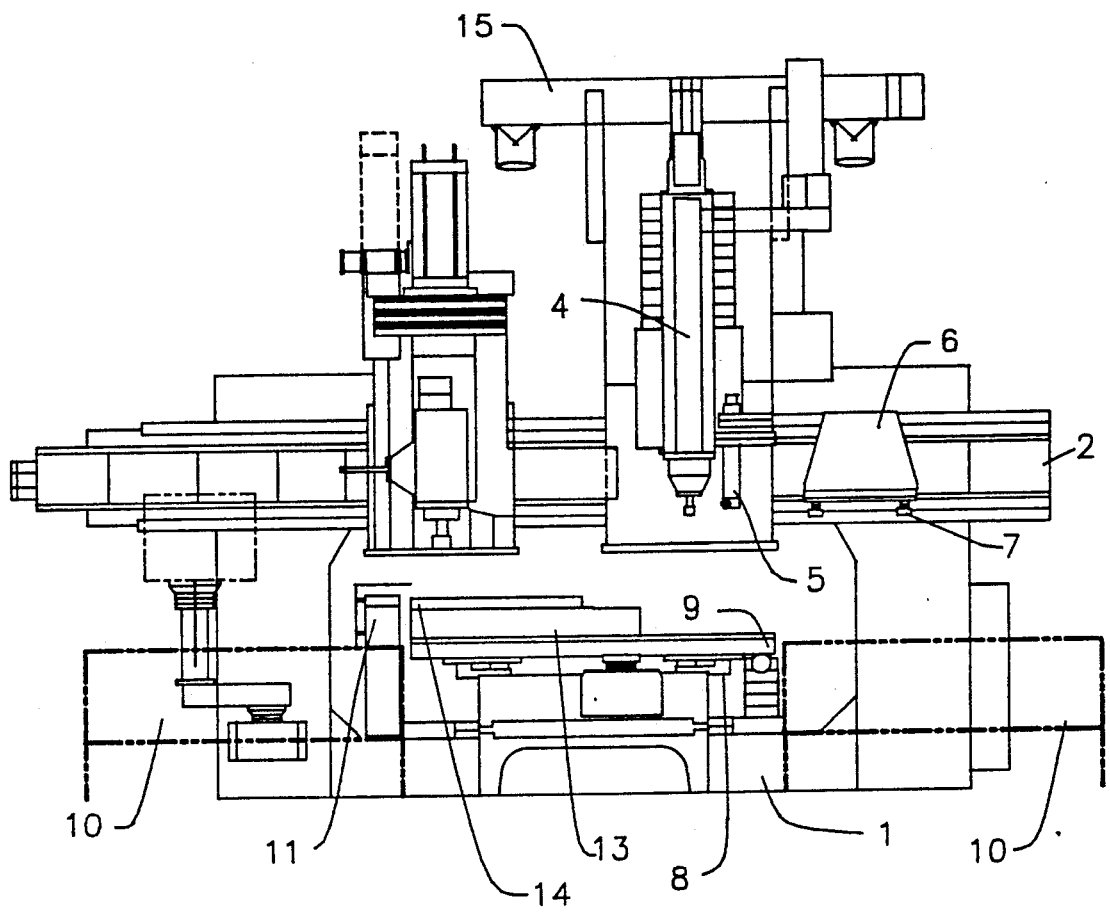
FIG. 1 shows a front view of a numerical control router of an embodiment in the present invention.
Figure 2:
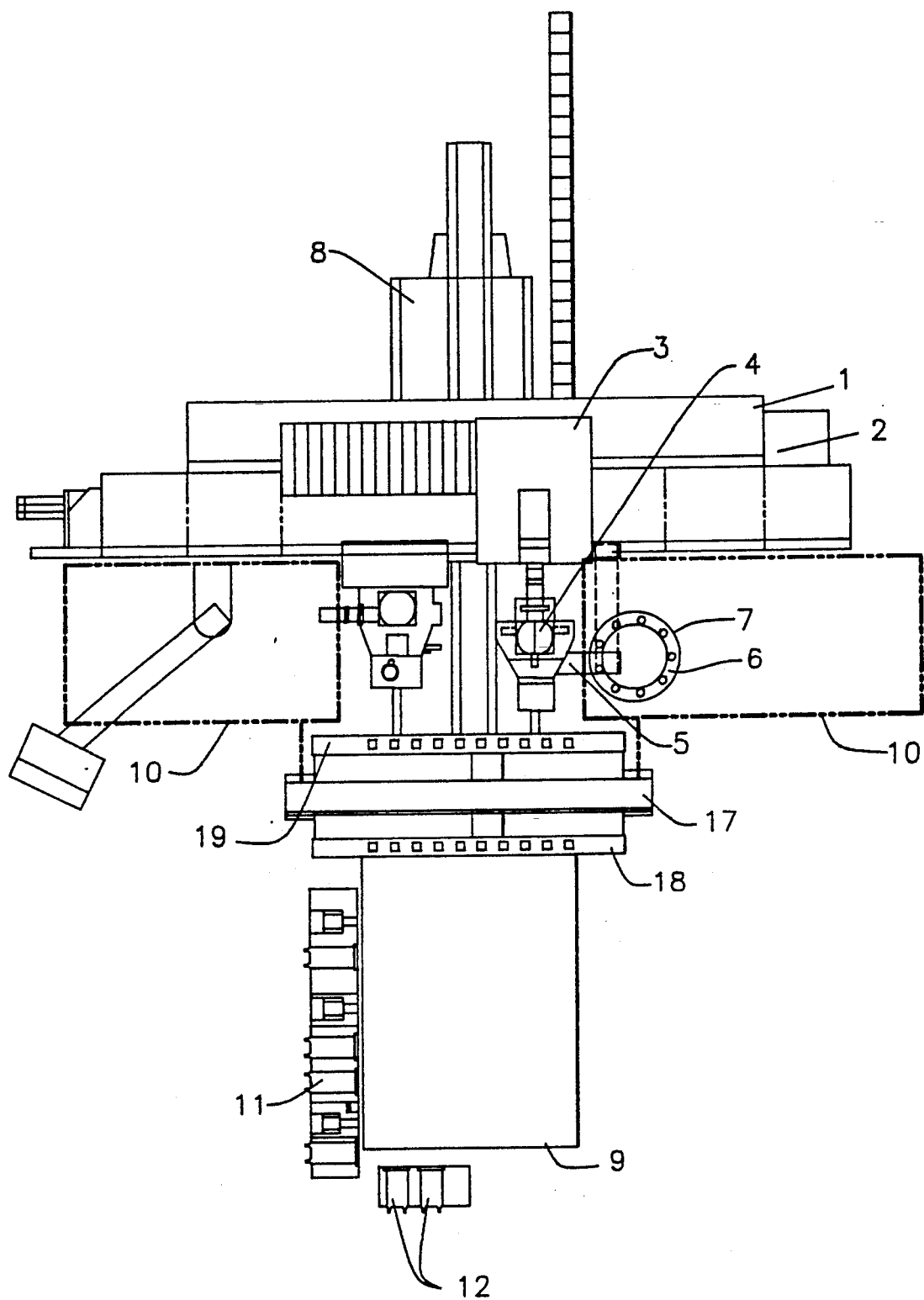
FIG. 2 shows a plane view of the numerical control router in FIG. 1 having a press and suction apparatus of the invention.
Figure 3:
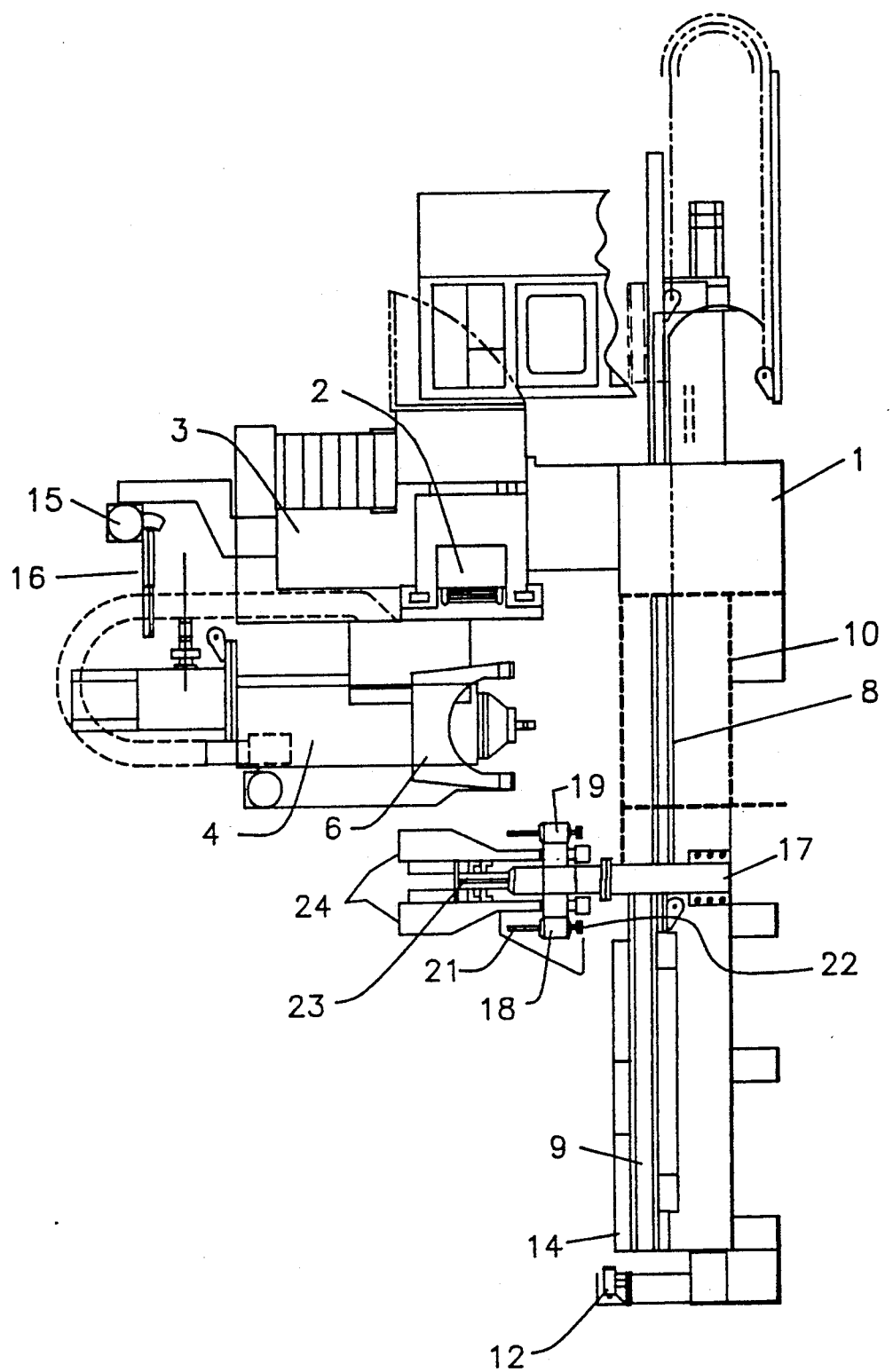
FIG. 3 shows a side view of the numerical control router in FIG. 2.

In a numerical control router in FIGS. 1, 2 and 3, a rail 2 is attached with a supporting bed 1, and a head structure 3 is mounted on the rail 2 to move left and right in FIG. 1. A head 4 is attached the head structure 3 to move up or down, motors are provided with the process head 4 and a tool such as a drill or cutter is attached to the rotary shaft of the motor.

A tool changer 5 and a tool magazine 6 having a plurality of tools 7 are attached to the side portion of the process head 4 and safety fences 10 are attached at both sides of the head. Rails 8 are attached to the supporting bed 1 under the head 4 and a suction table 9 is mounted on the rails 8 to move before and behind the head 4. Rule stoppers 11 and 12 are attached to the supporting bed 1 at two neighbouring sides of the suction table 9 slightly away from the suction table 9. A sacrifice board 13 and a process board 14 put on the suction table 9 are positioned by these rule stoppers 11 and 12.

Ducts 15 are attached to the upper portion of the head 4, valves (not shown) which open or close with cylinders 16 are attached to the ducts 15, and hoses (not shown) are connected to the ducts 15 to suck chips or dust on the suction table 9.

Figure 4:
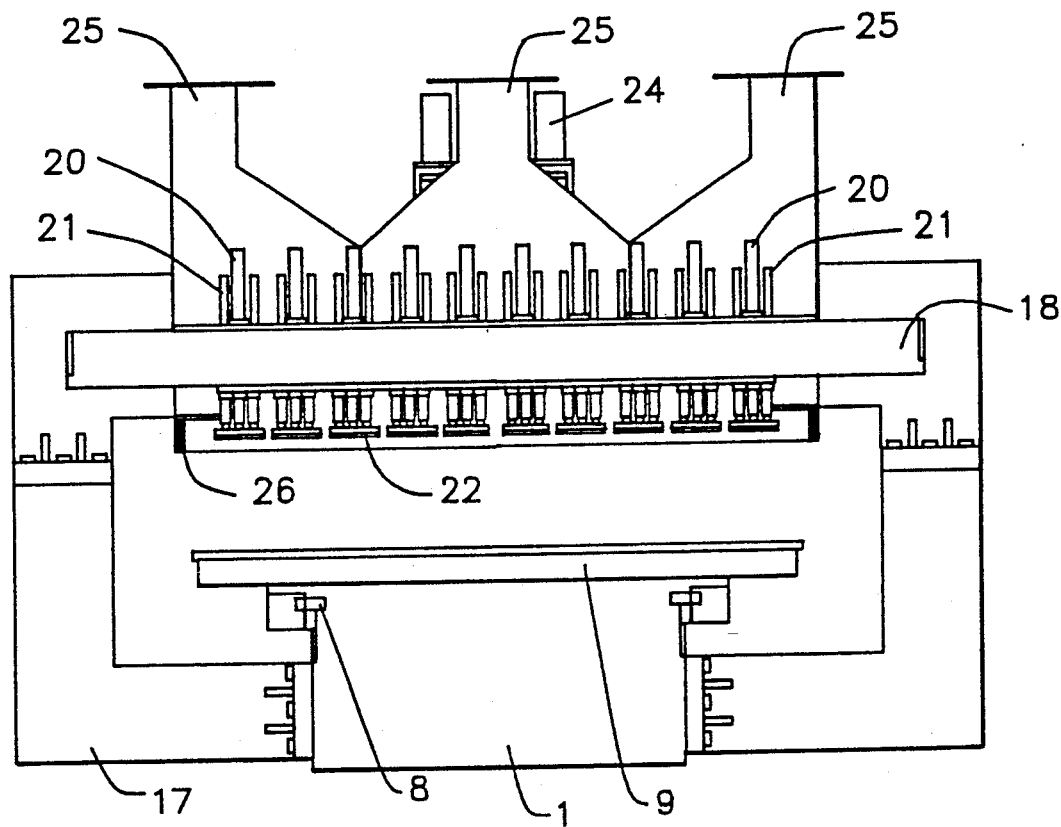
FIG. 4 shows a front view of a press and suction apparatus in the present invention.

As shown in FIGS. 2, 3 and 4, in the press and suction apparatus of the embodiment in the present invention, a supporting frame 17 is attached to the supporting bed 1 in front of the head 4. Supporting portions 18 and 19 are attached to the supporting frame 17 and a plurality of cylinders 20 and guides 21 are mounted to the supporting portions 18 and 19. A plurality of press portions 22 are attached to the moving shafts of the cylinders 20 and the lower portions of the guides 21.

A duct supporting portion 23 is mounted on the supporting frame 17 and cylinders 24 are attached on the duct supporting portion 23. Suction ducts 25 are provided on both sides of the supporting frame 17 to move up and down by the cylinders 24 and brushes 26 are attached to the suction ports of the suction ducts 25.

In the above suction and press apparatus, as shown in FIG. 1, when the sacrifice board 13 having the suction holes corresponding to the size of the process board is put on the suction table 9, the sacrifice board 13 is pressed to the rule stoppers 11 and 12 and positioned on the table 9. When the sacrifice board 13 is not flat and is not sucked on the suction table 9, the suction table 9 is moved under the supporting frame 17, the press portions 22 are lowered by the cylinders 20 and the sacrifice board 13 is pressed to suck on the suction table 9.

After the sacrifice board 13 is positioned on the suction table 9, the process board 14 is put on the sacrifice board 13, pressed to the rule stoppers 11 and 12 and is positioned on the table 9. When the process board is not flat and is not sucked on the table 9, as above, the suction table 9 is moved under the supporting frame 17, the press portions 22 are lowered by the cylinders 20 and the sacrifice board 13 is pressed to suck on the suction table 9.

In an embodiment of the present invention, when the sacrifice board 13 and the process board 14 are not flat, the suction table 9 is moved under the supporting frame 17, the sacrifice board 13 and the process board 14 are pressed with the press portions 22 by lowering the cylinders 20 and are sucked on the suction table 9. Therefore, the operation efficiency is improved.

Though chips generated when the process board 4 is processed by the process head 4 are sucked by the sucking hoses, the chips scattered on the process board 14, the sacrifice board 13 and the suction table 9 cannot be sucked by the suction hoses. Therefore, after the process of the process board 14 terminates, the suction table 9 is moved under the supporting frame 17, the suction ports of the suction ducts 25 are lowered near the process board 14 by the cylinders 24 and the chips scattered on the process board 14, the sacrifice board 13 and the table 9 are sucked by the suction ducts 25. Accordingly, when the next process board 14 is changed after the process of one process board 14 terminates, the suction holes of the sacrifice board 13 are not closed by the chips.

Also, when the chips are scattered on the sacrifice board 13, the positioning of the process board 14 is difficult and cannot be sucked on the suction table 9. This problem is solved by the suction ducts 25.

Figure 5:
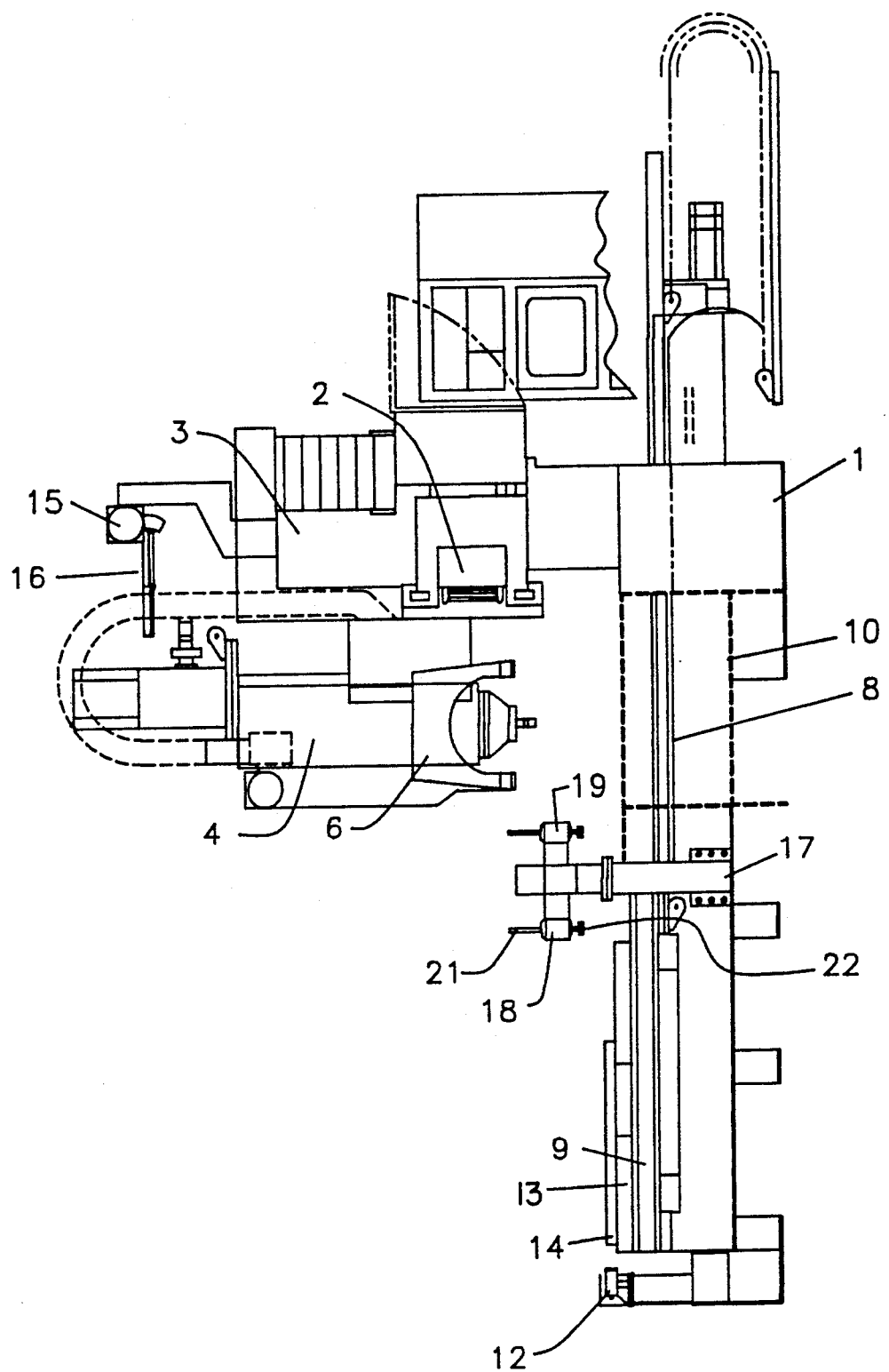
FIG. 5 shows a side view of the numerical control apparatus having the press apparatus in an other embodiment of the present invention.
Figure 6:
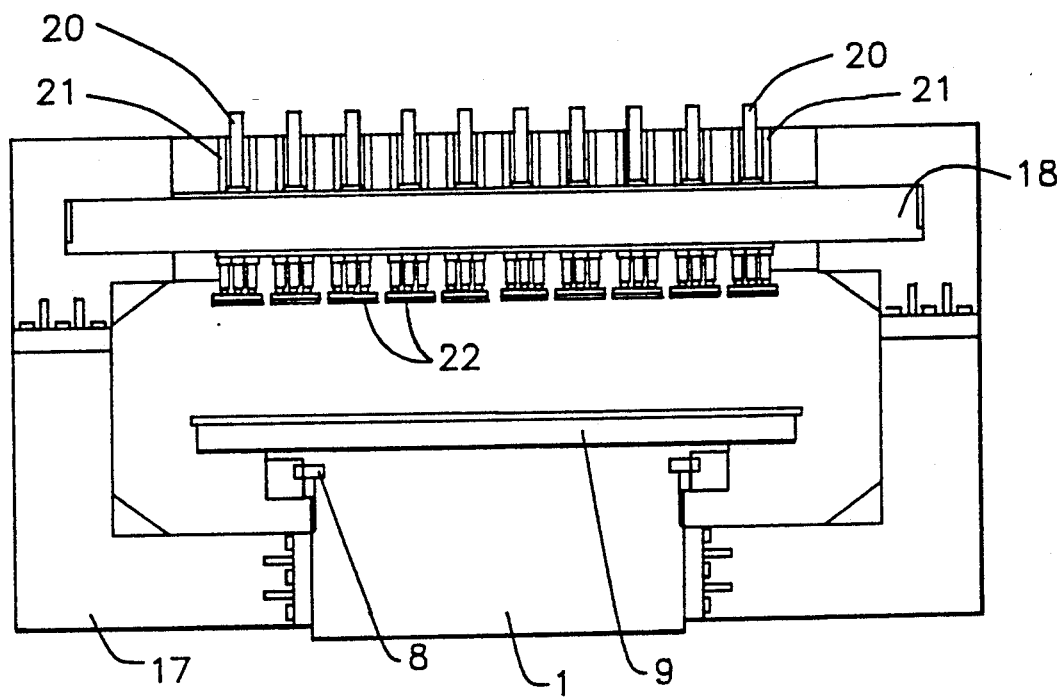
FIG. 6 shows a front view of a press apparatus in FIG. 5.

In another embodiment of the present invention as shown in FIGS. 5 and 6, 1 designates a supporting bed, 2; a rail, 3; a head structure, 4; a process head, 5; a tool changer, 6; a tool magazine, 7 designates tools, 8; rails, 9 designates a suction table, 10 designate safety fences, 11 and 12; rule stoppers and these numbers are the same as those in the above embodiment of the present invention. The supporting frame 17 is fixed the supporting base 1 at the front of the process head 4 and the supporting portions 18 and 19 are fixed to the supporting frame 17. The cylinders 20 and the guides 21 are fixed to the supporting portions 18 and 19 and the press portions 22 are fixed under the operation shaft of the cylinder 20 and the guides 21. The suction ducts 25 are not provided with the supporting frame 17.

In this embodiment, the sacrifice board and the process board which are not flat can be sucked on the suction table 9.

Figure 7:
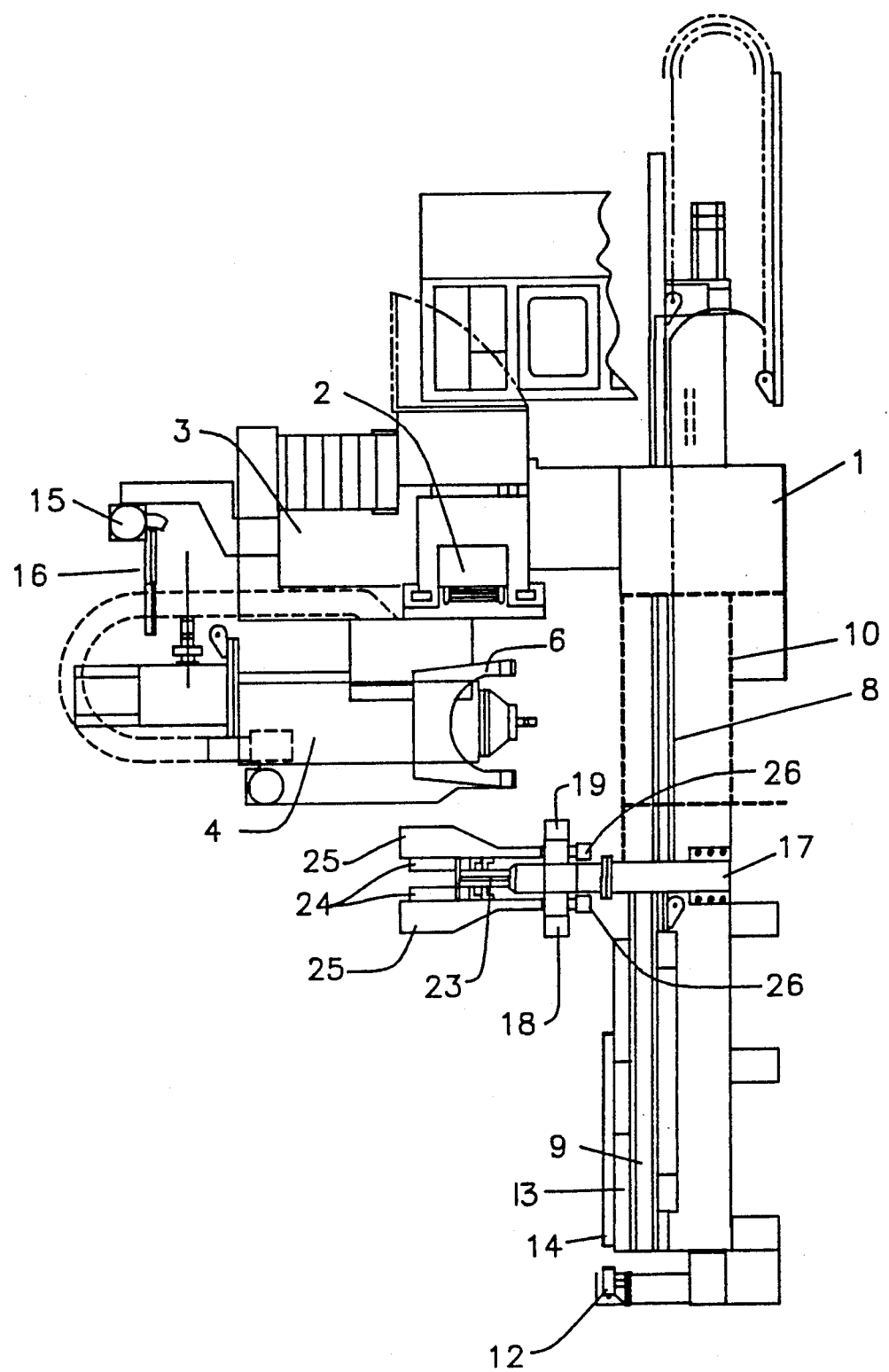
FIG. 7 shows a side view of the numerical control apparatus having the suction apparatus in an other embodiment of the present invention.
Figure 8:
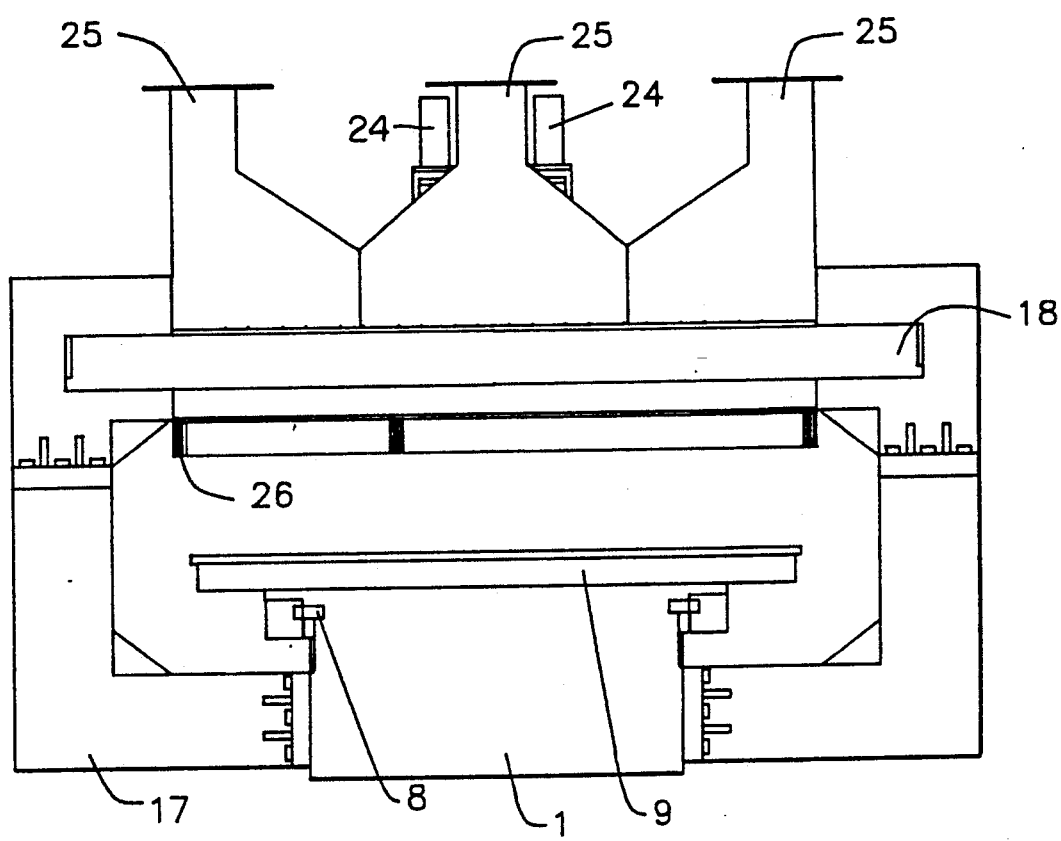
FIG. 8 shows a front view of a suction apparatus in FIG. 7.

In another embodiment of the present invention as shown in FIGS. 7 and 8, 1 designates a supporting bed, 2; a rail, 3; a head structure, 4; a process head, 5; a tool changer, 6; a tool magazine, 7 designates tools, 8; rails, 9 designates a suction table, 10 designates safety fences, 11 and 12; rule stoppers and these numbers are the same as those in the above embodiment of the present invention. The supporting portions 18 and 19 are fixed on the supporting frame 17 and the suction ducts 25 which are moved up and down by the cylinders 24 are fixed on the duct supporting portion 23. The suction ducts 25 are moved up and down by the cylinders 24 and are put between the supporting frame 17 and the supporting portions 18 and 19 and the brushes 26 are attached to the suction ports of the suction ducts 25.

In this embodiment, the chips which are scattered on the suction table 9, the sacrifice board 13 and the process board 14 are sucked with the suction ports of the suction ducts 25.

In another embodiment of the present invention as shown in FIGS. 9, 10, 11, 12 and 13, 1 designates a supporting bed, 2; a rail, 3; a head structure, 4; a process head, 5; a tool changer, 6; a tool magazine, 7 designates tools, 8; rails, 9 designates a suction table, 10 designates safety fences, 11 and 12; rule stoppers and these numbers are the same as those in the above embodiment of the present invention. A mounting portion 27 is fixed on the supporting frame 17 fixed to the supporting base 1, mounting plates 28 are attached to the mounting portion 27 and first cylinders 24a are attached to the mounting plates 28.

Second cylinders 24b are attached to the operating shafts of the first cylinders 24a, third cylinders 24c are attached to the operating shafts of the second cylinders 24b and supporting members 29 are attached to the operating shafts of the third cylinders 24c. A step operation means is constructed with the first, second and third cylinders 24a, 24b and 24c.

The suction ducts 25 are connected to the supporting members 29 and slide up and down with guides 30 attached to the supporting frame 17. The upper cylindrical portions of the suction ducts 25 are connected to hoses connected to a suction blower device (not shown) and the brushes 26 are attached to the suction ports of the suction ducts 25.

In this embodiment, when the cylinders 24a of the step operation means are driven, the suction ports of the suction ducts 25 are regulated to become the same height as the upper face of the suction table 9. After the suction blower device is operated, when the upper face of the suction table 9 is passed in the brushes 26 of the suction ports of the suction ducts 25, dust is removed on the upper face of the suction table 9. Then the suction table 9 is returned to the original position thereof, the suction ducts 25 are returned the original position by driving the first cylinders 24a and the suction blower device is stopped.

Figure 9:
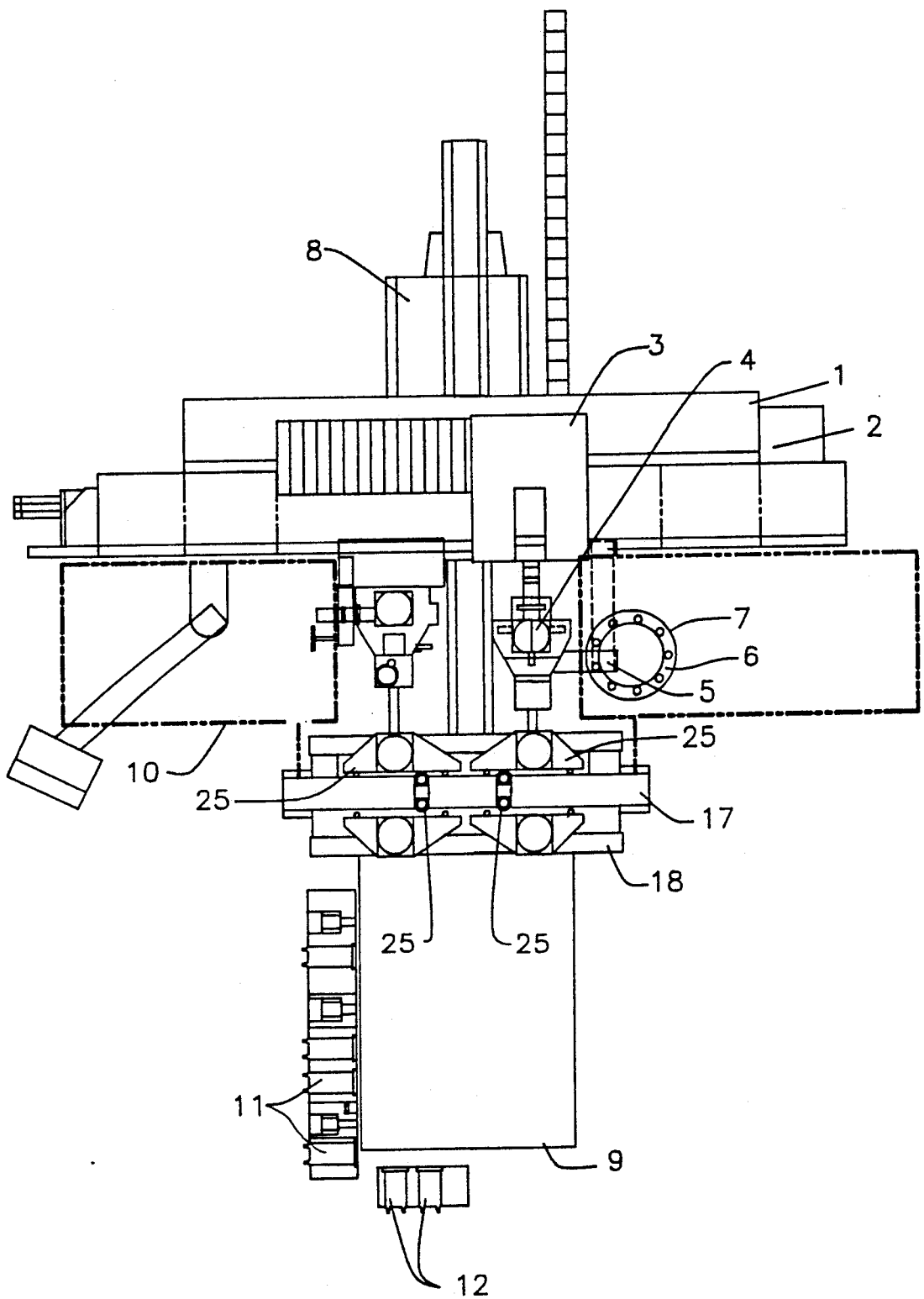
FIG. 9 shows a plane view of the numerical control apparatus having the suction apparatus in an other embodiment of the present invention.
Figure 10:
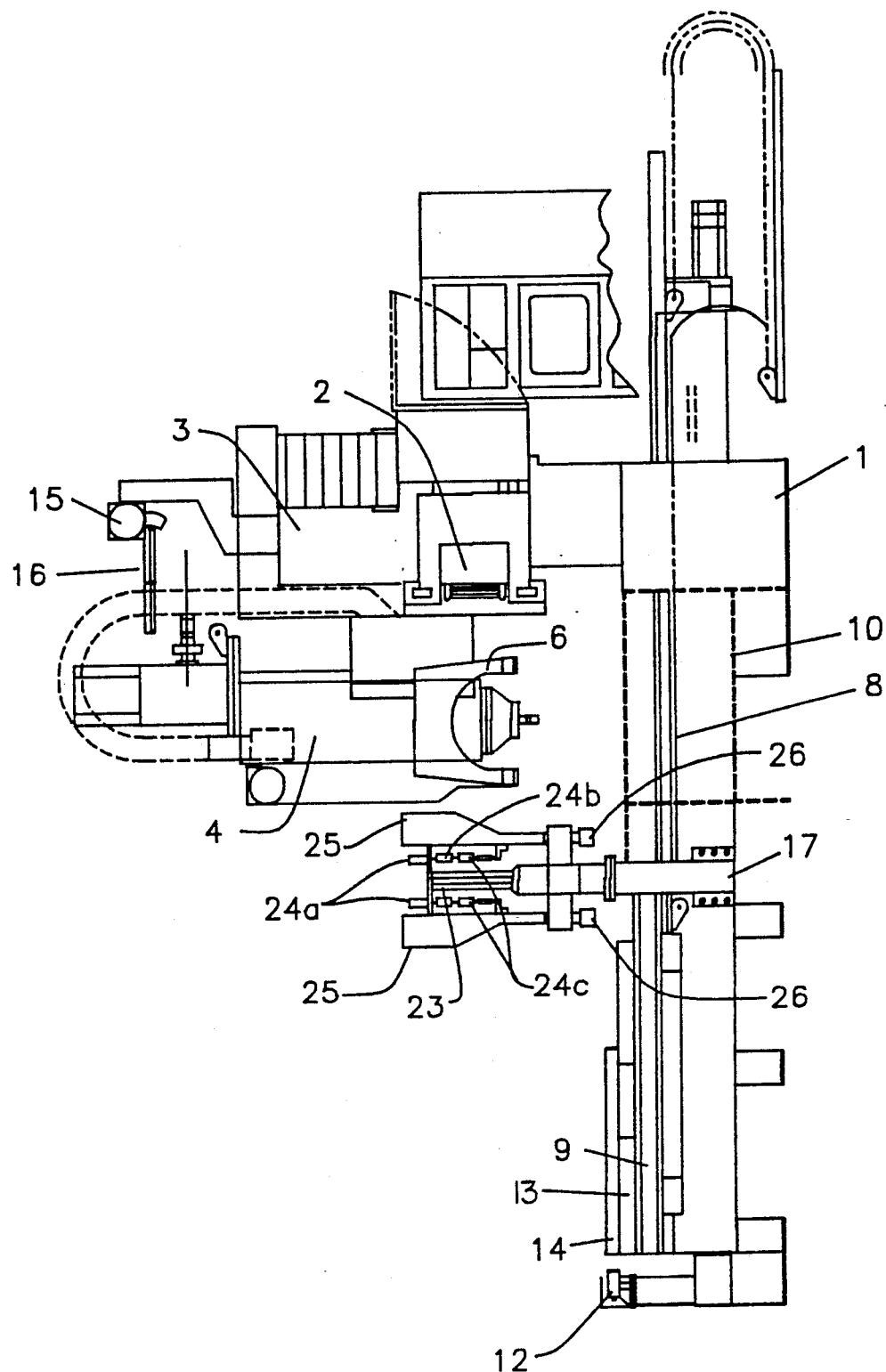
FIG. 10 shows a side view of the numerical control apparatus having the suction apparatus in FIG. 9.
Figure 11:
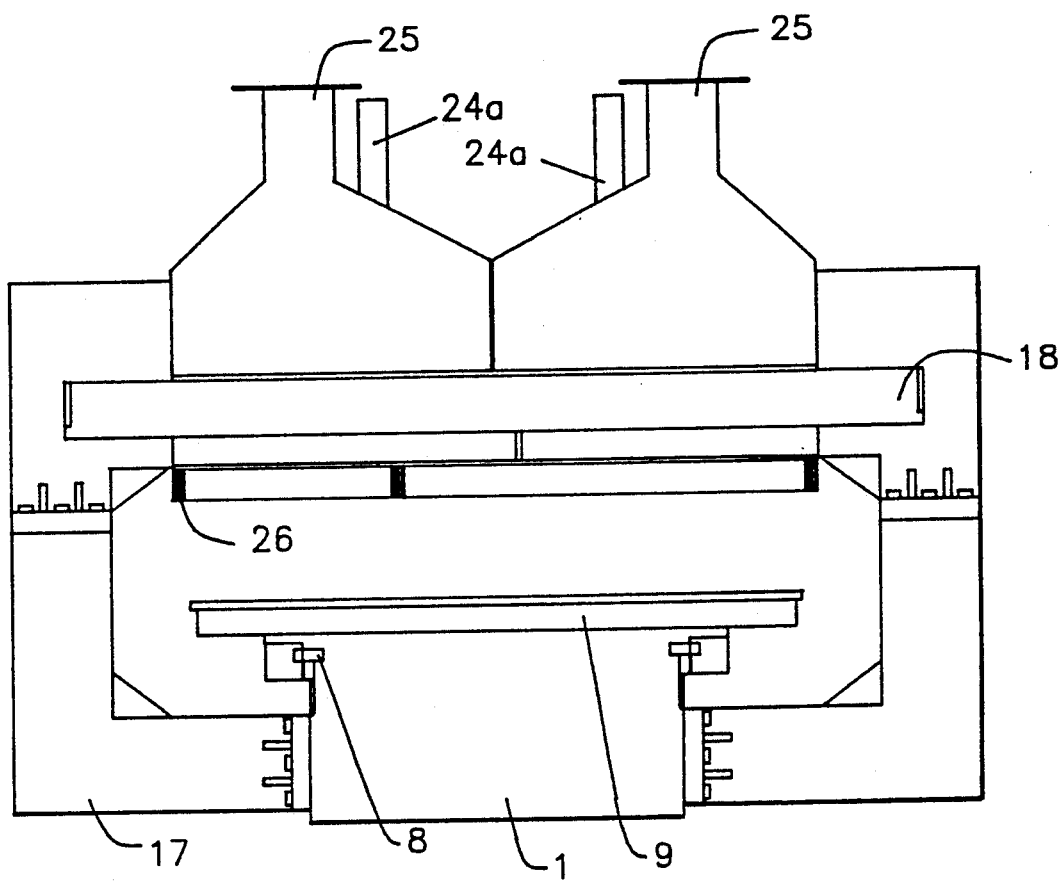
FIG. 11 shows a front view of a suction apparatus in FIG. 9.
Figure 12:
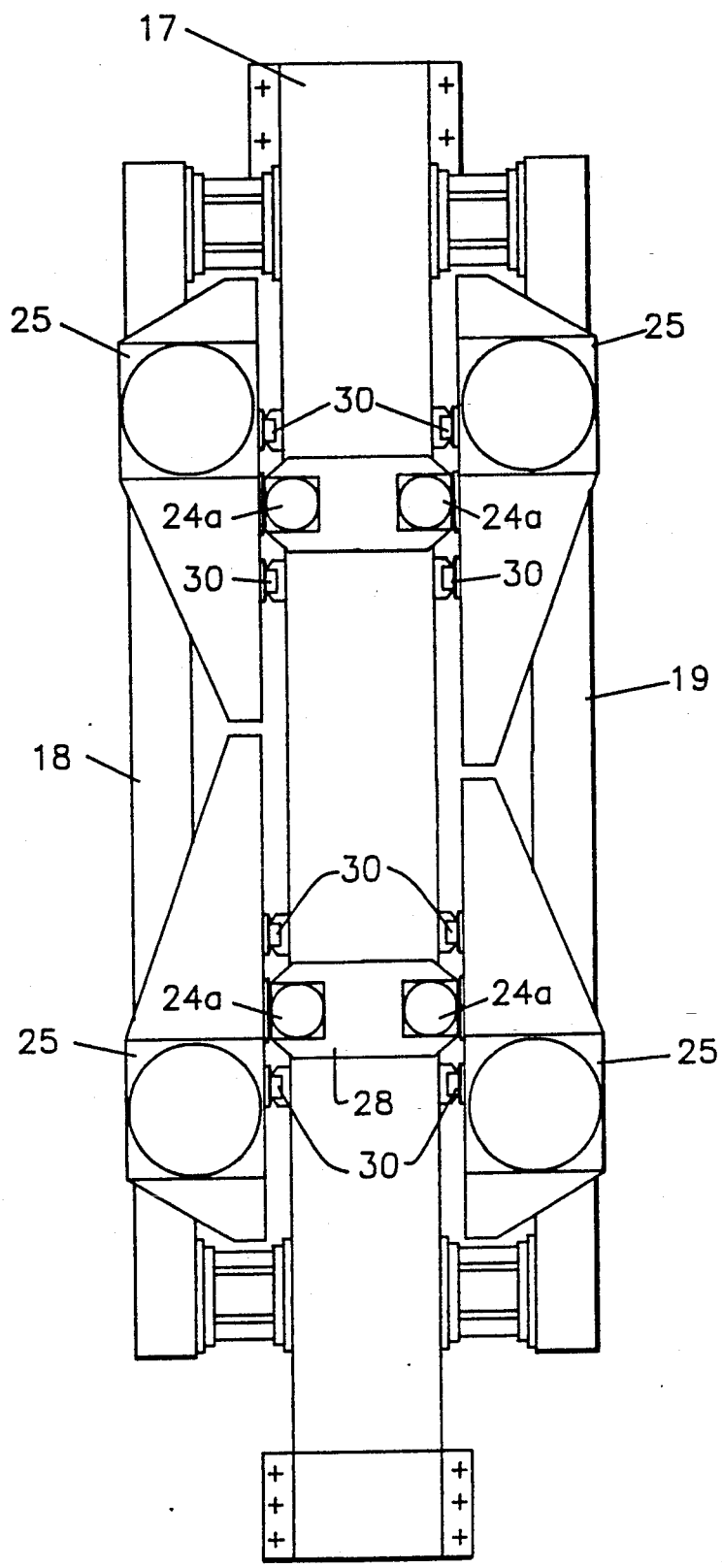
FIG. 12 shows a plane view of a suction apparatus in FIG. 9.
Figure 13:
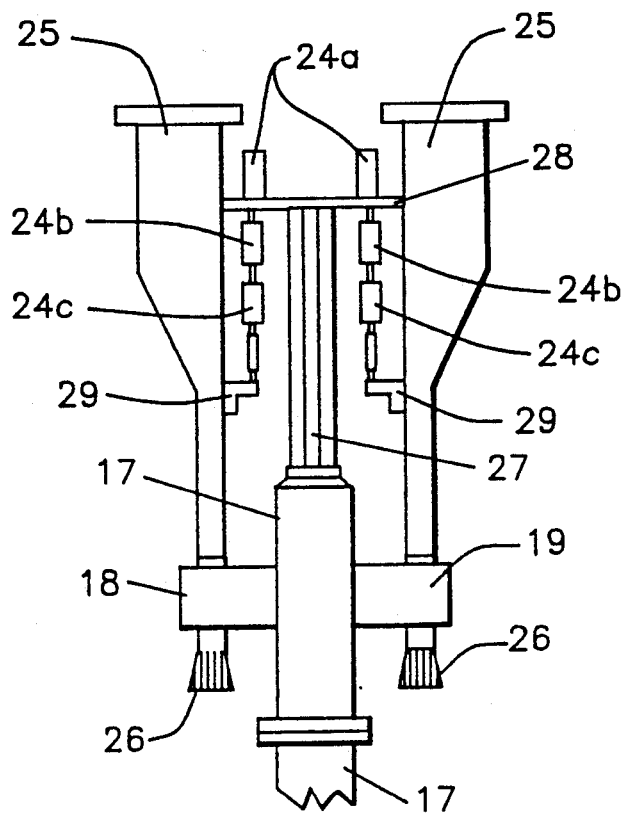
FIG. 13 shows a side view of a suction apparatus in FIG. 9.

As shown in FIG. 9, when the sacrifice board 13 is put on the suction table 9 and is positioned by pressing the rule stoppers 11 and 12, the sacrifice board 13 is sucked on the suction table 9. Also, when the process board 14 is put on the sacrifice board 13 on the suction table 9 and is positioned by pressing the rule stoppers 11 and 12, the process board 14 is sucked on the sacrifice board 13 on the suction table 9. Then the process board 14 is processed in predetermined process by the process head 4.

After the process of the process board 14 is terminated, the third cylinders 24c are driven to position the brushes 26 of the suction port of the suction ducts 25 near the upper face of the process board 14. When the suction blower device is driven, the suction table 9 is driven, the brushes 26 of the suction port of the suction ducts 25 are passed on the upper face on the process board 14 and the chips and dust on the process board 14 and the sacrifice board 13 are removed. Then the suction table 9 is returned to the original position thereof, the suction ducts 25 are returned to the original position by driving the third cylinders 24c and the suction blower device is stopped.

While the process on board 14 is carried out, the brushes 26 of the suction port of the suction ducts 25 are regulated to position near the upper face of the sacrifice board 13 by operating the second cylinders 24b. After the suction blower device is driven, when the upper face of the sacrifice board 13 on the suction table 9 is passed through the brushes 26 of the suction port of the suction ducts 25, the chips and dust on the sacrifice board 13 are removed. Then the suction table 9 is returned to the original position thereof, the suction ducts 25 are returned to the original position by driving the second cylinders 24b and the suction blower device is stopped. The next process board 14 is put on the sacrifice board 13, is positioned by the rule stoppers 11 and 12 and is processed in the same or next process.

As stated above, the chips scattered when the process board 14 is processed are removed by the hose of the head 4 and the chips scattered on the process board 14, the sacrifice board 13 and the suction table 9 are removed by the suction ducts 25. Accordingly, when the next process board 14 is changed after the process of the process board 14 is terminated, the suction holes of the sacrifice board 13 are stopped by the chips and the suction air leaks from the gap because the chips are inserted between the process board 14 and the sacrifice board 13. Such problem is solved by the suction apparatus of the present invention. Furthermore, because the suction ports of the suction ducts 25 can be regulated on the upper faces of the suction table 9, the sacrifice board 13 and the process board 14 by the first, second and third cylinders 24a, 24b and 24c, the chips and dust on the suction table 9, the sacrifice board 13 and the process board 14 are surely removed.

The suction ducts 25 can be driven by a servomotor and gear device instead of the cylinders 24a, 24b and 24c.

What is claimed is:

1. A press and suction apparatus of a numerical control router comprising:
    a supporting bed,
    a head structure provided with a process head having a main shaft motor with a rotary shaft for fixing a tool thereon of a drill or cutter,
    first rail means for moving the head structure and being provided on the supporting bed,
    suction table means for fixing a sacrifice board and a process board thereon,
    second rail means on the supporting bed for moving the suction table means at a right angle to movement of the head structure,
    a supporting frame attached to the supporting bed,
    a plurality of rigid press members,
    a plurality of press cylinder means, mounted on said supporting frame, for pressing said press members against at least one of the process board and sacrifice board when the process board or sacrifice board are placed on the suction table means, each said press cylinder means having a drive shaft and one said press member is secured to each said drive shaft,
    guide means, mounted on said supporting frame, for guiding said shafts during a pressing operation,
    a plurality of suction duct means for sucking dust and chips from the process board, the sacrifice board and the suction table, and
    a plurality of suction cylinder means for lowering said suction duct means to the process board, the sacrifice board and the suction table, each said suction cylinder means having a drive shaft and one said suction duct is secured to a drive shaft of each said suction cylinder means.

2. A press and suction apparatus of the numerical control router as set forth in claim 1, wherein brushes are attached to ports of the suction means.

3. A press and suction apparatus of the numerical control router as set forth in claim 1, wherein each said suction cylinder means includes three cylinders connected in series.

4. A press and suction apparatus of the numerical control router as set forth in claim 3 wherein the three cylinders can position suction ports of the suction duct means near upper faces of the suction table means, the sacrifice board and the process board, respectively.

* * * * *

UNITED STATES PATENT AND TRADEMARK OFFICE
CERTIFICATE OF CORRECTION

PATENT NO. : 5,326,200
DATED : July 5, 1994
INVENTOR(S) : Nobuyoshi Suzuki It is certified that error appears in the above-identified patent and that said Letters Patent is hereby corrected as shown below:

Column 1, line 3; "NUMBERICAL" should read --NUMERICAL--.

In the second line of the Title; "NUMBERICAL" should read -- NUMERICAL--.

Signed and Sealed this

Thirteenth Day of September, 1994

*Attest:*

BRUCE LEHMAN

*Attesting Officer*     *Commissioner of Patents and Trademarks*